United States Patent
Bosveld et al.

(10) Patent No.: US 12,472,531 B2
(45) Date of Patent: Nov. 18, 2025

(54) METHOD AND SYSTEM FOR CLASSIFYING ADDITIVE MANUFACTURED OBJECTS

(71) Applicant: Stratasys, Inc., Eden Prairie, MN (US)

(72) Inventors: Michael Bosveld, Bloomington, MN (US); Charles Alan Smithson, Minnetonka, MN (US); Thomas Peter Paul, Chanhassen, MN (US); Jason Robert Nixon, Minneapolis, MN (US)

(73) Assignee: STRATASYS, INC., Minnetonka, MN (US)

( * ) Notice: Subject to any disclaimer, the term of this patent is extended or adjusted under 35 U.S.C. 154(b) by 0 days.

(21) Appl. No.: 17/994,888

(22) Filed: Nov. 28, 2022

(65) Prior Publication Data

US 2023/0173545 A1 Jun. 8, 2023

Related U.S. Application Data

(60) Provisional application No. 63/285,821, filed on Dec. 3, 2021.

(51) Int. Cl.
| | |
|---|---|
| *B07C 5/34* | (2006.01) |
| *B07C 5/342* | (2006.01) |
| *B29C 64/118* | (2017.01) |
| *B29C 64/386* | (2017.01) |
| *B33Y 10/00* | (2015.01) |
| *B33Y 30/00* | (2015.01) |
| *B33Y 40/20* | (2020.01) |
| *B33Y 50/00* | (2015.01) |

(52) U.S. Cl.
CPC .......... *B07C 5/3422* (2013.01); *B29C 64/118* (2017.08); *B29C 64/386* (2017.08); *B33Y 10/00* (2014.12); *B33Y 30/00* (2014.12); *B33Y 40/20* (2020.01); *B33Y 50/00* (2014.12)

(58) Field of Classification Search
CPC ... B29C 64/118; B29C 64/386; B29C 64/393; G01N 21/892; B07C 5/3422
See application file for complete search history.

(56) References Cited

U.S. PATENT DOCUMENTS

| | | | |
|---|---|---|---|
| 5,503,785 | A | 4/1996 | Crump et al. |
| 6,492,651 | B2 | 12/2002 | Kerekes |
| 6,547,995 | B1 | 4/2003 | Comb |

(Continued)

FOREIGN PATENT DOCUMENTS

| | | |
|---|---|---|
| EP | 3045992 A1 | 10/2020 |
| JP | 2004061311 A * | 2/2004 |

(Continued)

OTHER PUBLICATIONS

JP 2004061311 A ; Kamata H; English Translation (Year: 2004).*

*Primary Examiner* — Joseph C Rodriguez
(74) *Attorney, Agent, or Firm* — Westman, Champlin & Koehler, P.A.

(57) ABSTRACT

A method of additive manufacturing comprises operating an additive manufacturing system for fabricating a multiplicity of objects, while acquiring a set of images during fabrication of each of the objects. For each object, a respective set of images is analyzed to identify fabrication irregularities, and a fabrication score is generated based on the irregularities. The multiplicity of objects is clustered according to the fabrication scores into at least two clusters.

19 Claims, 5 Drawing Sheets

(56) References Cited

U.S. PATENT DOCUMENTS

| | | |
|---|---|---|
| 7,267,731 B2 | 9/2007 | Iwasaki |
| 7,384,255 B2 | 6/2008 | LaBossiere et al. |
| 7,403,648 B2 | 7/2008 | Nakamura |
| 7,604,470 B2 | 10/2009 | LaBossiere et al. |
| 7,625,200 B2 | 12/2009 | Leavitt |
| 8,153,182 B2 | 4/2012 | Comb et al. |
| 8,419,996 B2 | 4/2013 | Swanson et al. |
| 8,425,218 B2 | 4/2013 | Pettis |
| 8,452,073 B2 | 5/2013 | Taminger et al. |
| 8,562,324 B2 | 10/2013 | Pettis |
| 8,647,102 B2 | 2/2014 | Swanson et al. |
| 8,747,097 B2 | 6/2014 | Pettis |
| 8,926,882 B2 | 1/2015 | Batchelder et al. |
| 8,992,202 B2 | 3/2015 | Pettis |
| 9,022,770 B2 | 5/2015 | Pettis |
| 9,156,204 B2 | 10/2015 | Knighton |
| 9,205,690 B2 | 12/2015 | Leavitt et al. |
| 9,327,537 B2 | 5/2016 | Conrow et al. |
| 9,399,321 B2 | 7/2016 | Ljungblad |
| 9,430,169 B2 | 8/2016 | Pettis |
| 9,527,242 B2 | 12/2016 | Rodgers et al. |
| 9,724,876 B2 | 8/2017 | Cheverton et al. |
| 9,751,262 B2 | 9/2017 | Graham et al. |
| 9,855,698 B2 | 1/2018 | Perez et al. |
| 9,886,015 B2 | 2/2018 | Wilson et al. |
| 9,925,714 B2 | 3/2018 | Rodgers et al. |
| 10,023,739 B2 | 7/2018 | Rodgers et al. |
| 10,114,591 B2 | 10/2018 | Pettis |
| 10,144,828 B2 | 12/2018 | Rodgers et al. |
| 10,189,210 B2 | 1/2019 | Rodgers et al. |
| 10,252,466 B2 | 4/2019 | Ramos et al. |
| 10,274,934 B2 | 4/2019 | Chang et al. |
| 10,363,704 B2 | 7/2019 | Woytowitz |
| 10,421,267 B2 | 9/2019 | Reese et al. |
| 10,427,348 B2 | 10/2019 | Perez et al. |
| 10,513,104 B2 | 12/2019 | Barclay et al. |
| 10,538,034 B2 | 1/2020 | Walker et al. |
| 10,807,302 B2 | 10/2020 | Rodgers et al. |
| 10,926,473 B1 | 2/2021 | Matusik et al. |
| 10,960,607 B2 | 3/2021 | Ostroverkhov et al. |
| 10,983,505 B2 | 4/2021 | Roychowdhury et al. |
| 10,994,477 B1 | 5/2021 | Matusik et al. |
| 10,994,490 B1 | 5/2021 | Matusik et al. |
| 11,014,163 B2 | 5/2021 | Preston et al. |
| 11,027,332 B2* | 6/2021 | Zalameda ............... B22F 10/22 |
| 11,084,276 B2 | 8/2021 | Reese et al. |
| 11,097,490 B2 | 8/2021 | Putman et al. |
| 11,117,192 B2 | 9/2021 | Preston et al. |
| 11,141,921 B2 | 10/2021 | Ramos et al. |
| 11,173,667 B2 | 11/2021 | Wang et al. |
| 11,225,018 B2 | 1/2022 | Wu et al. |
| 11,347,908 B2 | 5/2022 | Matusik et al. |
| 11,354,466 B1 | 6/2022 | Chen |
| 2011/0282482 A1 | 11/2011 | Knighton |
| 2012/0287473 A1 | 11/2012 | Pettis |
| 2014/0039662 A1* | 2/2014 | Boyer .................... B33Y 50/00 |
| | | 700/118 |
| 2015/0165681 A1 | 6/2015 | Fish et al. |
| 2015/0273583 A1 | 10/2015 | Bumgardner |
| 2016/0236414 A1 | 8/2016 | Reese et al. |
| 2017/0183497 A9 | 6/2017 | Rodgers et al. |
| 2017/0341183 A1 | 11/2017 | Buller et al. |
| 2018/0079125 A1 | 3/2018 | Perez et al. |
| 2019/0299523 A1 | 10/2019 | Wu et al. |
| 2019/0329322 A1* | 10/2019 | Preston ................ B29C 64/386 |
| 2020/0016883 A1 | 1/2020 | Reese et al. |
| 2020/0023537 A1 | 1/2020 | Fetfatsidis et al. |
| 2020/0189193 A1 | 6/2020 | Ostroverkhov et al. |
| 2020/0234507 A1 | 7/2020 | Haida |
| 2020/0324488 A1* | 10/2020 | Rumbak ............... B29C 64/209 |
| 2021/0173592 A1 | 6/2021 | Pettis |
| 2022/0347930 A1* | 11/2022 | Paddock ................ B33Y 50/02 |
| 2024/0094702 A1* | 3/2024 | Jain ........................ B22F 10/80 |

FOREIGN PATENT DOCUMENTS

| | | |
|---|---|---|
| WO | 2020093030 A1 | 5/2020 |
| WO | 2020123479 A1 | 6/2020 |
| WO | 2020142131 A2 | 7/2020 |
| WO | 2021086392 A1 | 5/2021 |
| WO | 2022013141 A1 | 1/2022 |
| WO | 2022026016 A1 | 2/2022 |
| WO | 2022235455 A1 | 11/2022 |

* cited by examiner

METHOD AND SYSTEM FOR CLASSIFYING ADDITIVE MANUFACTURED OBJECTS

CROSS REFERENCE TO RELATED APPLICATION

The present application claims the benefit of U.S. Provisional Patent Application Ser. No. 63/285,821, entitled METHOD AND SYSTEM FOR CLASSIFYING ADDITIVE MANUFACTURED OBJECTS that was filed on Dec. 3, 2021, the contents of which is incorporated by reference in its entirety.

BACKGROUND

The present disclosure, in some embodiments thereof, relates to an additive manufacturing and, more particularly, but not exclusively, to a method and a system for classifying objects manufactured by extrusion-based additive manufacturing.

Additive manufacturing (AM) is a process in which a three-dimensional (3D) object is built by adding material to freeform a 3D object. Using an additive manufacturing technique, a 3D solid object of virtually any shape can be printed from a digital model of the object by an additive manufacturing system. Additive manufacturing entails many different approaches, including extrusion-based additive manufacturing (e.g., fused deposition modeling, which may include continuous fiber deposition), 3D inkjet printing, selective laser sintering (SLS), powder or binder jetting, electron-beam melting, electrophotographic imaging, and stereolithographic processes. A typical additive manufacturing work flow includes slicing a three-dimensional computer model into thin cross sections, translating the result into two-dimensional position data, and feeding the data to a system which manufactures a layer of a 3D object for each cross section of the computer model in an additive build style.

In a typical extrusion-based additive manufacturing system, the cross sections provided by the slicing operation define toolpaths, and a 3D object is manufactured by extruding a viscous, flowable thermoplastic or filled thermoplastic material from a print head along the toolpaths at a controlled extrusion rate. The extruded flow of material is deposited as a sequence of roads or beads following the defined toolpaths. The material fuses to previously deposited material and solidifies upon a drop in temperature. The print head includes a liquefier which receives a supply of the thermoplastic material in the form of a flexible filament, and a nozzle tip for dispensing molten material.

A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print an object, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in U.S. Pat. No. 6,547,995, the contents of which are hereby incorporated by reference.

SUMMARY

According to an aspect of some embodiments of the present disclosure there is provided a method of additive manufacturing. The method comprises operating an additive manufacturing system for fabricating a multiplicity of objects, while acquiring a set of images during fabrication of each of the objects. For each object, a respective set of images is analyzed to identify fabrication irregularities, and a fabrication score is generated based on the irregularities. The multiplicity of objects is clustered according to the fabrication scores into at least two clusters.

According to some embodiments of the disclosure, the method comprises applying a physical test to an object of each cluster, and attributing a result of the mechanical test to at least one other object of the cluster for which the mechanical test was not applied.

According to some embodiments of the disclosure, the fabrication score comprises a single value for each object. According to some embodiments of the disclosure, the single value is a total number of irregularities identified for the object.

According to some embodiments of the disclosure, the fabrication score comprises a plurality of values for each object.

According to some embodiments of the disclosure, the plurality of values comprises a total number of irregularities for each of a plurality of types of irregularities identified for the object.

According to some embodiments of the disclosure, the plurality of values comprises a total number of irregularities for each of a plurality of types of irregularities identified for the object, and each of a plurality of locations of irregularities within the object.

According to an aspect of some embodiments of the present disclosure, there is provided a method of additive manufacturing. The method comprises, by an extruder system mechanically coupled to a camera, extruding a flow of building material to form building material beads along toolpaths forming layers corresponding to a shape of an object, and acquiring a set of images for each building material bead. For each layer, the images are stitched to provide a stitched image describing the layer. The stitched image is analyzed to identify bead irregularities, and a fabrication score for the object is generated based on the bead irregularities. The fabrication score is compared to a gold standard fabrication score, and a qualification score for the object is determined based on the comparison.

According to an aspect of some embodiments of the present disclosure, there is provided a method of additive manufacturing. The method comprises: by an extruder system mechanically coupled to a camera, extruding a flow of building material to form building material beads along toolpaths forming layers corresponding to a shape of an object, and acquiring a set of images for each building material bead. For each layer, the images are stitched to provide a stitched image describing the layer. The stitched image is and analyzed to identify bead irregularities, and a fabrication score for the object is generated based on the bead irregularities. The extruding, the stitching, the analyzing, and the generation of the fabrication score is repeated to provide a multiplicity of objects, which are then clustered into at least two clusters according to the fabrication scores.

According to some embodiments of the disclosure, the method comprises applying a mechanical test to an object of each cluster, and attributing a result of the mechanical test to at least one other object of the cluster for which the mechanical test was not applied. For example, the result of the mechanical test can be attributed to all the objects of the cluster for which the mechanical test was not applied.

According to some embodiments of the disclosure the fabrication score comprises at least a value indicative of a volume of the bead, and a value indicative of a location of the bead.

According to some embodiments of the disclosure, the extruder system is mechanically coupled to at least two cameras, each having a different field-of-view relative to the extruder system, wherein the stitching comprises stitching at least two images acquired by different cameras.

According to some embodiments of the disclosure, the imaging is at a wavelength selected based on a type of the building material.

According to some embodiments of the disclosure, the method comprises illuminating the building material by non-curing radiation detectable by the camera, wherein at least one of a wavelength and an intensity of the radiation is selected based on a type of the building material.

According to some embodiments of the disclosure, a first portion of the set of images is acquired while the extruder system extrudes the flow of building material, and a second portion of the set of images is acquired while the extruder system is paused from extruding the building material.

According to some embodiments of the disclosure, the extruding is in layers, and the method comprises, for each layer: receiving digital data pertaining to a toolpath associated with the layer; mapping the digital data onto a defined grid of area-elements over the layer so as to identify a group of area-elements along the toolpath; while the extruder system extrudes the flow of building material, acquiring the first portion of the set of images, and marking area-elements of the group that are contained in the images; and while the extruder system is paused, acquiring the second portion of the set of images, while guiding the extruder system along a path passing through all area-elements of the group other than the marked area-elements.

According to some embodiments of the disclosure, the method comprises monitoring a position of the extruder system, wherein the marking the area-elements is based, at least in part, on the monitored position.

According to some embodiments of the disclosure, the method comprises monitoring at least a velocity of the extruder system, wherein the marking the area-elements is based, at least in part, on the monitored velocity.

According to some embodiments of the disclosure, there is a single camera wherein each area-element is not imaged more than once.

According to some embodiments of the disclosure, there is a plurality of cameras, wherein for each camera, each area-element is not imaged more than once.

According to some embodiments of the disclosure, the stitching comprises stitching images of the first portion of the set of images before acquiring images of the second portion of the set of images.

According to an aspect of some embodiments of the present disclosure, there is provided a system of additive manufacturing. The system comprises: an extruder system; a controller configured for controlling the extruder system to extrude a flow of building material in layers to form building material beads along toolpaths corresponding to a shape of an object; and a camera, mechanically coupled to the extruder system, and being controllable by the controller to acquire a set of images of the building material beads. The system can also comprise a data processor configured to receive digital data pertaining to a toolpath associated with each layer, and to map the digital data onto a defined grid of area-elements so as to identify for the layer a group of area-elements along the toolpath. The controller is configured to control the camera to acquire a first portion of the set while the extruder system extrudes the flow of building material along the toolpath, and a second portion of the set while the extruder system is paused from extruding the building material but moves along a path. The data processor is configured to define the path based on all area-elements of the group that are not contained in images of the first portion.

According to some embodiments of the disclosure, the camera is thermally isolated.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods, and/or materials are described below. In case of conflict, the patent specification, including definitions, will control. In addition, the materials, methods, and examples are illustrative only and are not intended to be necessarily limiting.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof using an operating system.

For example, hardware for performing selected tasks according to embodiments of the disclosure could be implemented as a chip or a circuit. As software, selected tasks according to embodiments of the disclosure could be implemented as a plurality of software instructions being executed by a computer using any suitable operating system. In an exemplary embodiment of the disclosure, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

The present disclosure, in some embodiments thereof, relates to an additive manufacturing and, more particularly, but not exclusively, to a method and a system for classifying objects manufactured by extrusion-based additive manufacturing.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

AM systems have been used in the past for prototyping and very low volume manufacturing. With the advent of modern additive manufacturing technologies, AM systems have been geared to facilitate mass production of parts. The Inventors found, however, that while use of AM systems for fabricating of a multiplicity of identical parts is appealing and cost effective, it is not without certain operative limitations. In particular, the Inventors found that the ideal situation, in which multiple repetitions of the same AM process lead to the mass production of perfectly identical parts is hardly attainable, even when each repetition uses the same computer model, AM system, and materials. This is due to random or otherwise unexpected imperfections that may occur during the process. For example, in extrusion-based AM, uncontrollable variations in the flowrate of the extruded building material may result in a bead that is too thick or too thin compared to the desired thickness, and imperfections in the extrusion process may result in inaccurate location of the bead.

The Inventors have therefore devised a technique that improves the mass production of three-dimensional objects. The technique can be use in any type of AM, including, without limitation, extrusion-based AM (e.g., fused deposition modeling), 3D inkjet printing, selective laser sintering (SLS), powder or binder jetting, electron-beam melting, electrophotographic imaging, and stereolithography. In a preferred embodiment, an extrusion-based AM is employed. Following is a description of an extrusion-based AM system suitable for the present embodiments. It is to be understood, however, that while the embodiments below are described with a particular emphasis to extrusion-based AM, some embodiments of the disclosure consider other types of AM systems including, without limitation, a system employing one of the aforementioned types of AM.

An extrusion-based AM system according to some embodiments of the present disclosure can utilize one or more filaments (or other feedstock) of building material(s) that are converted to a flowable state and extruded for deposition along toolpaths to build a given 3D object, optionally and preferably in layers. A typical material of the filament is a thermoplastic, polymer or copolymer material. When used in the AM system of the present embodiments, the thermoplastic, polymer or copolymer material can be a part material or support material.

While the embodiments below are described with a particular emphasis to extrusion-based AM systems that employ filaments, it is to be understood that the present embodiments are useful in any AM technique that employs an extrusion head technology, including, without limitation, heated tube, gear pump, screw, pellets, reinforced filaments, and the like.

The consumable building material may be any extrudable material or material combinations. Generally, consumable materials that may be printed according to the present disclosure include, by way of example only and not by way of limitation, organic, inorganic and composite materials. An exemplary building material suitable for the present embodiments includes, without limitation, one or more amorphous polymeric materials and/or one or more semi-crystalline polymeric materials, and thermosets, and may include fillers, chopped fibers, and/or a continuous fiber reinforcement. Examples of suitable thermoplastic base polymers can include acrylonitrile-butadiene-styrene (ABS) copolymers, acrylonitrile styrene acrylate (ASA), styrene-acrylonitrile resin (SAN), polylactic acid (PLA), cyclic olefin copolymer (COC), polyethylene terephthalate (PET-G), polyetheretherketone (PEEK) or polyetherketoneketone (PEKK) family, polycarbonates, polysulfones, polyethersulfones, polyphenylsulfones, polyimides, polyetherimides, polyamides and modified variations thereof (e.g., nylon-12 copolymers manufactured by Stratasys, Inc. located in Eden Prairie, Minn.), polystyrene, polypropylenes, copolyesters, and blends thereof. Examples of metals which can be amenable for use as embodiments are a variety of stainless steel types, Inconel, Tungsten, aluminum, copper, cobalt, titanium and tool steel materials. The building material can include one or more amorphous polymers that are substantially miscible with one or more semi-crystalline materials. Exemplary semi-crystalline polymer materials suitable for the present embodiments include, without limitation, those disclosed in U.S. Pat. Nos. 9,527,242, 9,925,714 and 10,023,739, 10,189,210, 10,144,828, and U.S. Published Patent Applications 2017/0183497 and U.S. Pat. No. 10,807,302.

In some embodiments, fillers are added to the material where the fillers are in the range of about 1 wt % and about 90% of the total weight of the material. Exemplary fillers include glass fibers, carbon fibers, particles, or combinations thereof.

In some embodiments, additives such as antioxidants and/or processing aids (e.g., lubricants) are added to the blend. The additives may range from of 0.1 wt % to about 10 wt % of the total weight of the material.

Composite materials amenable to use with embodiments of the present disclosure include by way of example and not by way of limitation carbon fiber filled nylon, fiber reinforced thermoplastics, fiberglass reinforced thermoplastics, chopped or continuous composite fibers, and the like. In some embodiments, a composite building material may be a fiber-reinforced filament feedstock comprising one or more types of continuous fibers in a resin matrix. The continuous fibers may be extended, woven, or non-woven fibers in random or fixed orientations and may consist of, for example, carbon fibers, glass fibers, fabric fibers, metallic wires, and optical fibers. The fiber-reinforced filament may also consist of short fibers alone or in combination with one or more continuous fibers. Appropriate fibers or strands include those materials which impart a desired property, such as structural, conductive (electrically and/or thermally), insulative (electrically and/or thermally), and/or optical. Further, multiple types of fibers may be used in a single fiber-reinforced filament to provide multiple functionalities such as electrical and optical properties.

The building material is optionally and preferably in a filament form that is suitable for use in an extrusion-based AM. In one embodiment, the extrusion-based AM system can form the 3D object in a layer-by-layer manner where the layers are planar. In some embodiments, the 3D object is printed utilizing toolpaths that form non-planar patterns, toolpaths that form planar patterns, or combinations of toolpaths that form non-planar patterns and toolpaths that form planar patterns.

Figure 1:
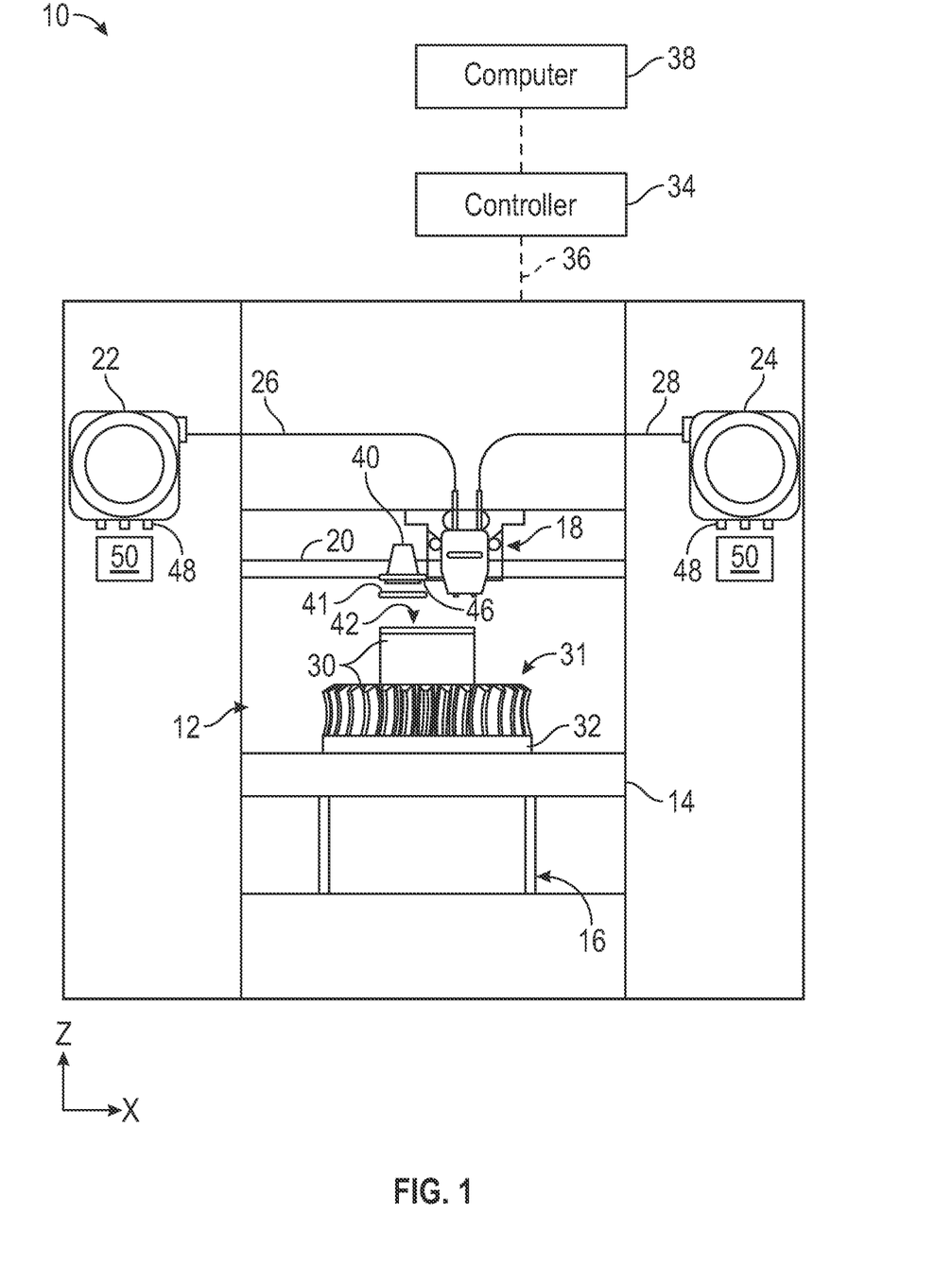
FIG. 1 is a schematic illustration of a front view of an exemplary additive manufacturing (AM) system, suitable for some embodiments of the present disclosure.

FIG. 1 is a schematic illustration of a front view of an exemplary AM system 10, suitable for some embodiments of the present disclosure. In the illustrated embodiment, system 10 is an extrusion-based AM system for printing or otherwise building a 3D object 31. The AM system can use part material for building the final object 30, and support material for building one or more sacrificial support structures 32, which together from that fabricated object 31. Suitable extrusion-based AM systems that can be embodied as system 10, include, without limitation, fused deposition modeling systems developed by Stratasys, Inc., Eden Prairie, Minn., under the trademark "FDM".

In the illustrated embodiment, system 10 comprises a chamber 12, a platen 14, an extruder system 18, and consumable assemblies 22 and 24. Chamber 12 optionally and preferably forms an enclosed environment that contains platen 14 and any fabricated objects. Chamber 12 can be heated (e.g., with circulating heated air, not shown) to reduce the rate at which the part and support materials solidify after being extruded and deposited. In alternative embodiments, chamber 12 can be omitted and/or replaced with different types of build environments. For example, objects can be built in a build environment that is open to ambient conditions or may be enclosed with alternative structures (e.g., flexible curtains).

Platen 14 serves as a platform on which the object 31 is fabricated, optionally and preferably, in a layer-by-layer manner. In some embodiments, platen 14 also comprises a flexible polymeric film or liner (not shown) on which the object is fabricated. In the illustrated example, extruder system 18 is a dual-tip extrusion head configured to receive consumable filaments from consumable assemblies 22 and 24, for example, via feed tube assemblies 26 and 28, for extruding part and support materials to form object 31 on platen 14. Consumable assembly 22 may contain a supply of a part material, and consumable assembly 24 may contain a supply of a support material.

Platen 14 can be supported by a controllable platen gantry assembly 16. Optionally and preferably, gantry assembly 16 is configured to move platen 14 along (or substantially along) a vertical z-axis. Correspondingly, extruder system 18 can be supported by a controllable head gantry assembly 20, which is optionally and preferably configured to move extruder system 18 in a horizontal (or substantially horizontal) x-y plane within chamber 12. In an alternative embodiment, platen 14 may be configured to move in the horizontal x-y plane and extruder system 18 may be configured to move along the z-axis. Other similar arrangements may also be used such that one or both of platen 14 and extruder system 18 are moveable relative to each other over a desired number of degrees of freedom. Platen 14 and extruder system 18 may also be oriented along different axes. For example, platen 14 may be oriented vertically and extruder system 18 may fabricate object 31 along the x-axis or the y-axis.

While FIG. 1 shows system 10 in a configuration in which extruder system 18 is mounted on a gantry assembly configured for one-, two- or three-dimensional motion, this need not necessarily be the case, since in some embodiments of the present disclosure extruder system 18 is mounted on a controllable multi-axis machine tool layout capable of movement along multiple axes (e.g., a six-degree of freedom machine tool layout). Such a controllable multi-axis machine tool layout can be embodied, by way of example and without limitation, as a robotic arm. An exemplary robotic arm is an industrial robot manufactured by KUKA Robotics of Augsburg, Germany.

The multi-axis machine tool layout can be mounted to move on a rail or a gantry (e.g., gantry assembly 20) to provide additional degrees of freedom.

The extruder system 18 can have any suitable configuration. An example of a device suitable to be used as extruder system 18 includes an extruder-based print head, such as those disclosed in U.S. Pat. Nos. 5,503,785, 7,384,255, 7,604,470, 7,625,200, 8,153,182, 8,419,996, 8,647,102, 8,926,882 and 10,513,104, the contents of which are hereby incorporated by reference.

System 10 also comprises a controller 34, which can include one or more control circuits configured to monitor and operate the components of system 10. One or more of the control functions performed by controller 34 can be implemented in hardware, software, firmware, and the like, or a combination thereof. Controller 34 can communicate over a communication line 36 with chamber 12 (e.g., with a heating unit in chamber 12), extruder system 18, and various sensors, calibration devices, display devices, and/or user input devices.

System 10 and/or controller 34 can also communicate with computer 38, which can include one or more discrete computer-based systems that communicate with system 10 and/or controller 34, and may be separate from system 10, or alternatively may be an internal component of system 10. Computer 38 can comprise computer-based hardware, such as data storage media, processors, memory modules, and the like for generating and storing toolpaths and related printing instructions. Computer 38 may transmit these instructions to system 10 (e.g., to controller 34) to perform printing operations.

A computer model data representative of object 31 to be fabricated can be created, such as by scanning an existing object to create a digital image file, or such as by creating a model using a computer-aided design (CAD) program. The computer model data and/or instructions for printing the model can be loaded into computer 38. The computer 38 can communicate with controller 34, which serves to direct the system 10 to fabricate the 3D object 31. Part and support materials are deposited, optionally and preferably in layers, along toolpaths that build upon one another to form the 3D object 31.

Some embodiments of the present disclosure contemplate use of one or more cameras during the AM process. The camera or cameras can be arranged such that at least a portion of the object being fabricated is within their field-of-view. The camera or cameras can be mechanically coupled to the mechanism that builds the object by depositing or irradiating the building material (e.g., extruder system 18 in case of AM system 10, or an inkjet print head in case of inkjet 3D printing, or a laser system in case of SLS or stereolithography, etc.). Alternatively, the camera(s) can be mounted at other locations without being mechanically coupled to the building mechanism. For example, the camera(s) can be static at a fixed location within the chamber 12.

Further contemplated, are embodiments in which one or more of the cameras is mounted on a separate controllable gantry or other multi-axis machine tool layout (e.g., robotic arm) which is configured to move independently of the motion of the building mechanism of the AM system.

Controlled relative motion between the camera(s) and object 31 is preferred from the standpoint of simplicity in image analysis, since it allows combining information pertaining to the location of the camera(s) relative to object 31 with the information contained in the images generated by the camera(s), as further detailed hereinbelow. A mechanical coupling between the camera and the building mechanism is preferred from the standpoint of control simplicity.

The camera or cameras are optionally and preferably controlled by the controller of the AM system, in which case the controller can transmit activation signals to the cameras to acquire images of the scene enclosed within their field-of-view. The images acquired by the camera or cameras can be used to identify fabrication irregularities in the object while it is being fabricated by the system. Preferably, at least one of the images include a concealed region of the object.

As used herein, "concealed region" refers to any region of the object which, once the manufacturing process of the object is completed, is visibly obstructed from all sides by the external surface of the object. For example, a concealed region can be a region within an internal layer of the object.

As used herein, "fabrication irregularity" refers to any deviation of the fabricated object or a portion thereof from the computer data (e.g., toolpath) according to which the object is fabricated.

The identified fabrication irregularities can include fabrication defects, and/or irregularities in the geometry of the object or some portion of the object. The fabrication irregularities can be discrete irregularities that are identified within a defined space, such as, but not limited to, an irregularity in the shape or size of a particular portion of the object or a segment of a bead. The identified fabrication irregularities can also be continuous, for example, a textural irregularity that is not necessarily confined within a defined space.

The cameras are preferably digital cameras which generate image data and transmit the image data to the controller and/or the computer. The computer may, in some embodiments of the present disclosure, apply various image processing operations to the image data received from the cameras as further detailed hereinbelow.

In the embodiment illustrated in FIG. 1, which is not to be considered as limiting, AM system 10 comprises one or more cameras 40 arranged such that at least a portion of platen 14 (or object 31, once the AM process is commenced) is within their field-of-view 42, wherein at least one of the cameras 40 is mechanically coupled to extruder system 18. For example, camera 40 and extruder system 18 can be mounted on the same gantry assembly 20 or multi-axis machine tool layout (e.g., robotic arm), allowing camera 40 and extruder system 18 to move together.

Figure 2:
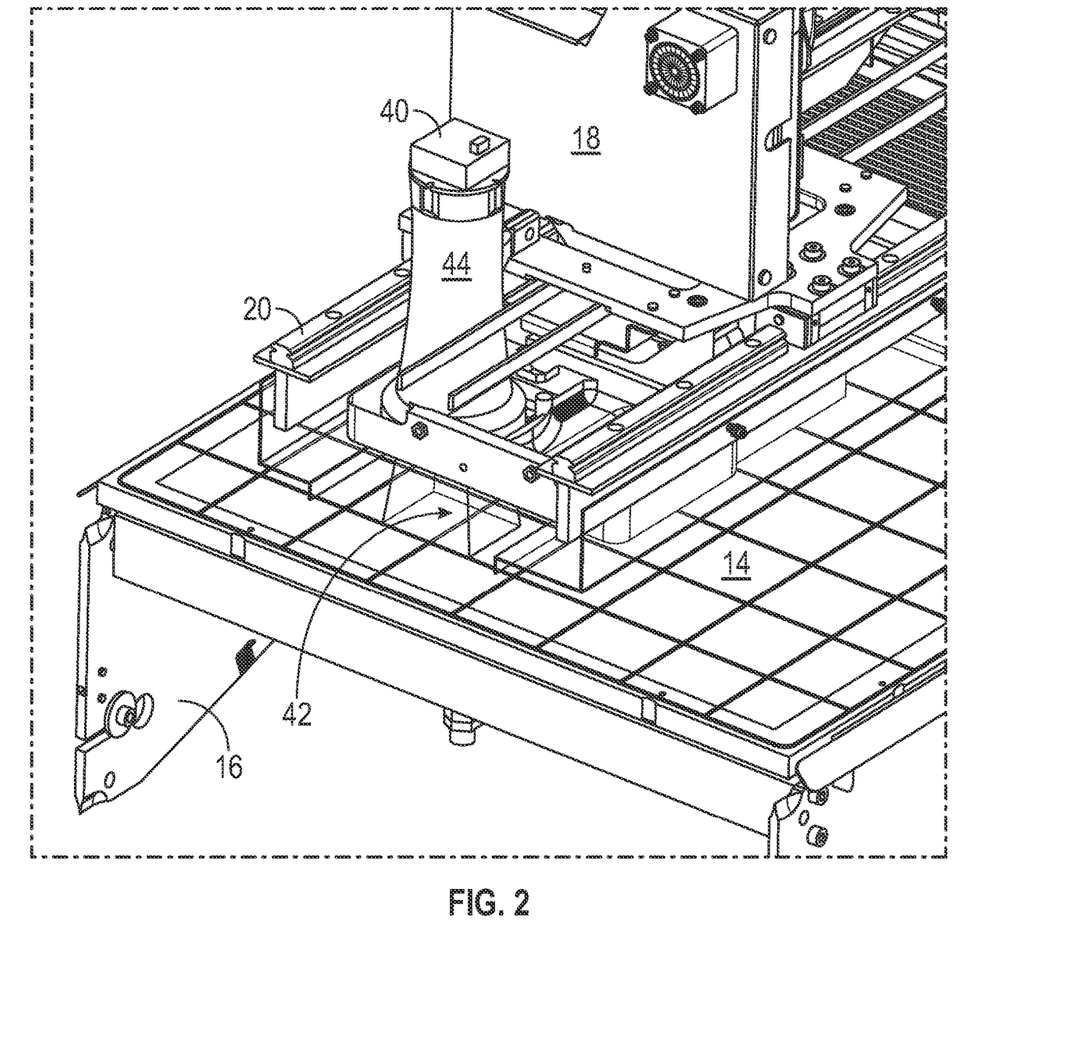
FIG. 2 is a schematic illustration of an exemplified configuration including a camera and an extruder system on the same gantry assembly, according to some embodiments of the present disclosure.

An exemplified configuration including camera 40 and extruder system 18 on the same gantry assembly 20 is schematically illustrated in FIG. 2. In the illustrated embodiment, camera 40 is mounted on top of a tube 44 that serves for blocking stray light from entering into the imager of camera 40, thereby defining the camera's field-of-view 42, so that substantially all the light that enters the imager is the light that is reflected from the building material immediately below camera 40.

When system 10 comprises more than one camera, the cameras are optionally and preferably positioned at locations selected to ensure that, for at least one location of extruder system 18, and more preferably for any location of extruder system 18, each point on the upper surface of platen 14 is within the field-of-view of at least one of the cameras. For example, two cameras can be mounted on gantry 20 at opposite sides of extruder system 18, or three or more cameras can be mounted on gantry 20 at locations that define a convex polygon, wherein extruder system 18 can be at the center of the polygon.

Camera 40 preferably generates color or monochromatic visible light images, but images capturing other domains of the electromagnetic spectrum are also contemplated. Representative examples of such images include, without limitation, infrared images, ultraviolet images, ultrasound images, and X-ray images. Combination of these types of images are also contemplated. For example, one camera can generate images from light in one domain of the electromagnetic spectrum, and another camera can generate images from light in another domain of the electromagnetic spectrum. Also contemplated, are embodiments in which the same imager is sensitive to more than one domain (e.g., sensitive to visible light as well as infrared light).

In some embodiments of the present disclosure, camera 40 is configured to employ polarized imaging. The advantage of using polarized imaging is that it reduces imaging artifacts such as glare. In a typical implementation of polarized imaging, camera 40 includes one or more polarizing filters 41 that allow light components of a certain polarization to arrive at the imager and block other light components. For example, the imager of camera 40 can include a set of 2×2 Bayer RGB filters, wherein each of the pixels of the Bayer RGB filter is configured to receive polarization along a different direction (0°, 45°, 90° and 135°).

In some embodiments of the present disclosure, system 10 comprises a light source 46 that illuminates the field-of-view 42 of camera 40. Light source 46 can be an annular light source surrounding the aperture of camera 40, as illustrated in FIG. 1, or it can have other shapes and/or be mounted at other locations of system 10. The light produced by light source 46 is within the same domain of the electromagnetic spectrum to which the imager of camera 40 is sensitive. Preferably, light source 46 produces radiation that does not cure the building materials used by the AM system. In some embodiments of the present disclosure system 10 comprises a light source 46 is configured to provide polarized illumination. These embodiments are particularly useful when camera 40 employs polarized imaging. For example, light source 46 can be configured to provide different polarizations from different sides of extruder system 18, thus facilitating capturing a structured light image by camera 40.

In some embodiments of the present disclosure, the wavelength and/or the intensity of the light produced by light source 46 is selected based on the type of the building material used by system 10. Typically, the wavelength and/or intensity of the light is selected such as to maximize the contrast of the acquired images, or at least to ensure that the contrast is above a predetermined threshold. In some embodiments of the present disclosure, light source 46 is replaceable, so that when a different building material is loaded to system 10, light source 46 can be replaced with a replacement light source that ensures a better contrast for images of beads made of the different building material.

In some embodiments of the present disclosure, light source 46 is controllable by controller 34 in a manner that controller 34 can select the intensity, and optionally and preferably also the wavelength, of the light produced by light source 46, responsively to the type of material that is loaded to system 10. The type of material that is loaded to system 10 can be determined automatically by controller 34. For example, consumable assemblies 22 and 24 can each include an identification tag 48, such as, but not limited to, a barcode or the like, and system 10 can comprise a tag identification circuit 50, such as, but not limited to, a barcode reader. Controller 34 can receive a signal from circuits 50, and determine the type of the building materials in system 10 based on this signal. Alternatively, the type of material that is loaded to system 10 can be determined based on a user input received, e.g., via a user interface (not shown) associated with computer 38.

Figure 3:
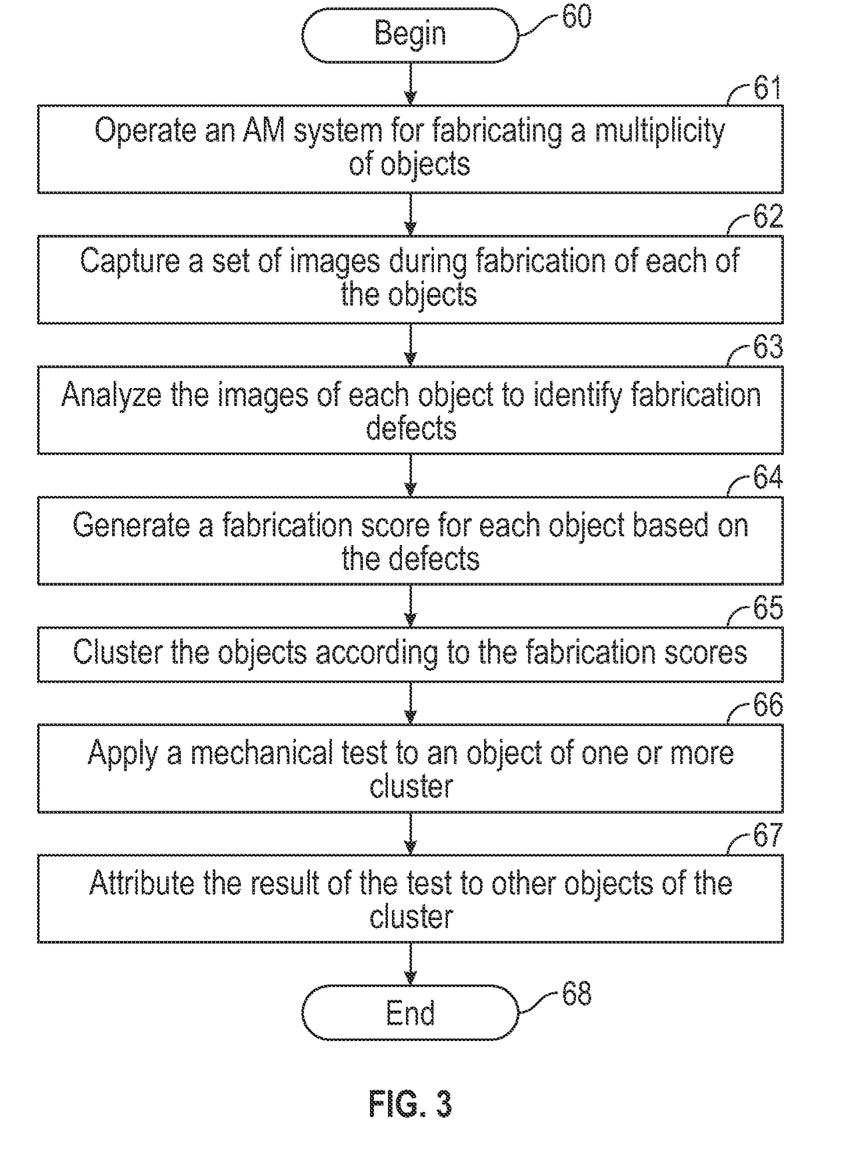
FIG. 3 is a flowchart diagram describing a method suitable for AM according to various exemplary embodiments of the present disclosure.

FIG. 3 is a flowchart diagram of a method suitable for AM according to various exemplary embodiments of the present disclosure. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 60 and continues to 61, at which an AM system is operated to fabricate a multiplicity of objects. The number of objects in the multiplicity of objects is preferably at least 100. The AM system used at 61 can be of any of the aforementioned types of AM system, and the camera(s) can be of the types cameras described above. Preferably, but not necessarily, the AM system is an extrusion-based AM system (e.g., AM system 10). Preferably, but not necessarily, the camera(s) are mechanically coupled to the building mechanism (e.g., extruder system 18) of the AM system. In embodiments in which the AM system is an extrusion-based AM system, the extruder system forms building material beads along toolpaths corresponding to the shape of the object, and the method optionally and preferably acquires a set of images for each building material bead.

The method can continue to 62 at which a set of images is acquired by one or more cameras during the fabrication of each of the objects. In some embodiments of the present disclosure operation 62 is executed such that one portion of the set of images is acquired while the building mechanism of the AM system is active (e.g., extrudes or dispenses building material, in case of extrusion-based or jetting-based AM, or irradiates a layer in case of SLS or stereolithography), and another portion of the set of images is acquired while the building mechanism is inactive. A more detailed description of a preferred protocol for image acquisition in embodiments in which an extrusion-based AM is employed is provided below.

Figure 5A:
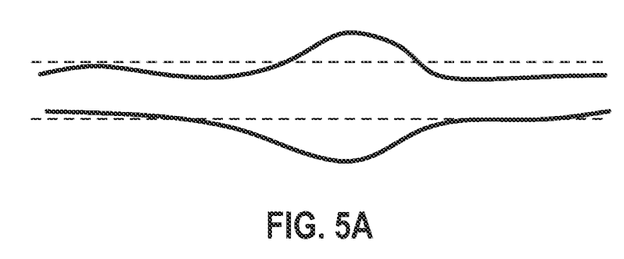
FIGS. 5A-C are schematic illustrations of fabrication irregularities detectable according to some embodiments of the present disclosure.
Figure 5B:
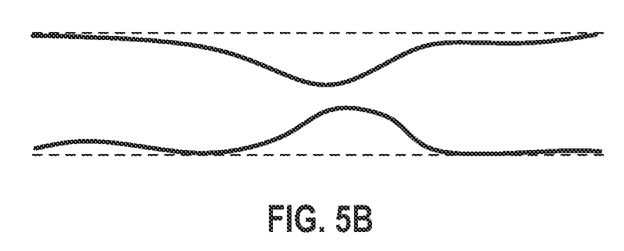
Figure 5C:
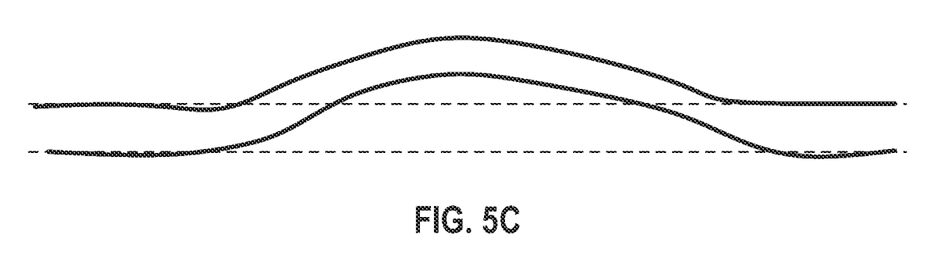

The method proceeds to 63, at which the set of images of each of the objects is analyzed to identify fabrication irregularities, e.g., bead defects in cases in which extrusion-based AM is employed. For example, a fabrication irregularity can be defined as a bead which is extruded at a size (e.g., volume, cross-section) that is different than the intended size, or a bead which is extruded at a location that is different from the intended location. A representative example of an extruded bead which wider than the intended width is schematically illustrated in FIG. 5A, a representative example of an extruded bead which is narrower than the intended size is schematically illustrated in FIG. 5B, and a representative example of an bead which is extruded at a location that is different from the intended location is schematically illustrated in FIG. 5C. In FIGS. 5A-B, thick lines represent the boundary of the extruded bead, and dashed lines represent the respective portion of the toolpath, along which the bead is intended to be extruded.

The images can be processed by the processor of the AM system and compared to the computer model data loaded to the computer of the AM system, or to two-dimensional position data obtained from the computer model data. Mismatches between the computer model data and the images can then be identified as irregularities. Typically, the mismatches are subjected to a thresholding procedure wherein a mismatch exceeding a predetermined threshold is considered a irregularity, and a mismatch not exceeding the predetermined threshold is not considered an irregularity.

In embodiments in which the camera is in controllable motion, the analysis 63 optionally and preferably comprises stitching at least a portion of the acquired images to provide a stitched image, wherein the aforementioned comparison is applied to the stitched image. When images are acquired both while the building mechanism is active and while the building mechanism is inactive, the stitching is optionally and preferably executed firstly only for those some images that are acquired while the building mechanism is active, providing a partially stitched image. Thereafter, the other images can be stitched to the partially stitched image, providing the stitched image to which the aforementioned comparison is applied. Further, according to some embodiments of the present disclosure, the images that are acquired while the building mechanism is active can be stitched before the other images are acquired.

Preferably, the method combines information pertaining to the location of the camera at the time of image capture with the imagery information of the image itself. Typically, the computer of the AM system receives the location of the camera at the time of image capture from the controller that controls its motion and also its operation. The computer can also obtain, for example from a computer readable storage medium, the dimensions of the camera's field-of-view. The computer can then select from the computer model data a portion that corresponds to the field-of-view of the camera at the received location. Once the portion of the computer model data is selected, the computer can compare the image data of the image with the selected portion of the computer model data. For example, the two-dimensional position data obtained from the computer model data can be tiled into a plurality of tiles, where each tile corresponds to a particular two-dimensional location over the position data, and where the dimensions of each tile are the same or approximately the same as the dimensions of camera's field-of-view. The computer can select the tile that matches the received location of the camera and use the selected tile for the comparison.

The advantage of combining information pertaining to the location of the camera with the imagery information of the image is that it allows to computer to use, for each image, only a portion of the computer object data, thus reducing the computation load required for the comparison.

The method proceeds to 64 at which a fabrication score is generated for each object based on the irregularities. In the simplest case, the fabrication score can comprise a single value for each object. For example, the fabrication score can include a total number of irregularities identified for the respective object. In this embodiment, the method counts the number of irregularities identified at 63 and uses this number to define a fabrication score. Oftentimes, however, it may be desired to have a fabrication score which comprises a plurality of values for each object, and which can be represented, e.g., as a vector of values. The Inventors found that such a score describes the integrity of the object more accurately, since it allows, for example, to distinguish between different types of irregularities for the same object.

As a representative non-limiting example, consider a case in which the AM system is an FDM® 3D printer available from Stratasys, Inc. In FDM® printers, variations in the flowrate of the extruded build material may result in a bead that is defective with respect to its volume, and imperfections in the extrusion process may result in a bead that is defective with respect to its location. In this case, the camera acquires images of the extruded beads, and compares them to the toolpaths obtained from the computer model data. For a given bead, the comparison can reveal that the size (e.g., volume, cross-section) of the bead deviates from the size of the respective segment of the toolpath, thus identifying a first type of irregularity. The comparison can also reveal that the bead deviates from its intended location within the toolpath, thus identifying a second type of irregularity.

The values that form the score vector can therefore comprise the total number of irregularities for each of a plurality of types of irregularities identified for the object. Also contemplated, are embodiments in which irregularities at different locations within the object are counted separately. For example, irregularities that are located far from the outer surface of the object can be counted separately from irregularities that are located near to the outer surface of the object. And/or, irregularities identified in regions made of the support material can be counted separately from irregularities that are identified in the regions made of the part material. Thus, according to some embodiments of the present disclosure, the values that form the score vector comprise a total number of irregularities for each of a plurality of types of irregularities identified for the object, and also for each of a plurality of locations of the irregularities within the object. As a representative example consider an object for which a plurality of irregularities is identified as summarized in Table 1, below.

TABLE 1

| Row Number | Road Width- too thin | Road Width- too wide | Bead location- wrong location, less than 1 mm from target | Bead location- wrong location, further than 1 mm from target |
|---|---|---|---|---|
| Row 1 | 2 | 5 | 6 | 1 |
| Row 2 | 1 | 3 | 5 | 2 |
| Row 100 | 0 | 4 | 7 | 3 |
| Average | 1.75 | 3.65 | 5.8 | 2.7 |

In this example, which is not to be considered as limiting the score vector can be the vector (1.75, 3.65, 5.8, 2.7).

Once all the fabrication scores are generated for all the fabricated objects, the method proceeds to 65 at which the objects are clustered according to the fabrication scores into two or more clusters. The clusters are defined such that the fabrication scores of all the objects within a given cluster are more similar to each other than the fabrication scores of objects that belong to different clusters. The similarity between scores can be according to any similarity metric. For example, the types of irregularities can be weighed such that the contribution to the similarity is higher for some types of irregularities and lower for other types of irregularities. Alternatively, the similarity metric can define the same weight for all types of irregularities. As a representative example, which is not to be considered as limiting, the similarity metric can be defined as the norm of the score vector, e.g., the Euclidian norm.

In some embodiments of the present disclosure, the method proceeds to 66 at which a physical test, such as, but not limited to, a mechanical test or an electrostatic dissipation tests, is applied to an object of one or more of the clusters. The physical test typically depends on the function for which the objects are designed. For example, when the objects are designed to sustain buckling, the mechanical test is a buckling test, when the objects are designed to sustain compression, the physical teste is a mechanical test such as a compressive strength test, when the objects are designed to sustain rotation, the physical test is a mechanical test such as a rotation test, and so on. Preferably, the physical test is applied to a single object of one or more of the clusters (e.g., a single object of each cluster). The method can then proceed to 67 at which, for each cluster, the result of the physical test is attributed to one or more other objects of the cluster for which the test was not applied. Preferably, the result of the test is attributed to all other objects of the cluster.

The present disclosure determined that since all the objects in a given cluster are similar from the standpoint of their fabrication scores, it is sufficient to apply the physical test to a single object of the cluster, thus saving on the number of physical tests that need to be applied. An additional advantage of the present embodiments is that it allows disqualifying a collection of objects at a relatively small level of effort. For example, consider a case in which n clusters are defined at 65, and in which the physical test 66 is applied to a single object of each cluster. Suppose that, of the n tested objects, the test qualifies only one particular object. In this case, the method qualifies all objects that share the same cluster with that particular object, and disqualifies all the objects in the remaining n−1 clusters.

The method ends at 68.

The present embodiments are also useful for establishing a knowledge base that can predict the quality of the fabricated object. For example, the physical test data can be correlated back to the number and types of fabrication irregularities found at 63. The results of the correlation can be used to construct a database, which can be stored in a retrievable manner (e.g., on a computer-readable storage medium), and be used immediately or at a later time. The constructed database can include a plurality of entries, each having a fabrication score, for example, as obtained at 64, and an object qualification score. The qualification score is indicative of the quality of the object, and can be a binary score (e.g., "passed" and "failed", or "0" and "1") or a numerical non-binary on a predetermined scale (e.g., from zero to nine).

When it is desired to construct a database, the physical test is optionally and preferably applied to a sufficient number of objects so as to construct a sufficiently large database. For example, the physical test can be applied to at least 50% or at least 60% or at least 70% or at least 80% or at least 90% of the objects, e.g., to all the objects. The results of the physical tests can then be analyzed so as to determine a gold standard for extrusion-based AM. In particular, the analysis can determine a gold standard fabrication score or a gold standard range of fabrication scores that is characteristic for each object qualification score, and the determined gold standard fabrication scores or fabrication score ranges can be used as entries of the database.

As a representative example, which is not to be considered as limiting, suppose that a gold standard fabrication score associates five occurrences of beads that are too narrow (see FIG. 5B) with a "failed" qualification score.

Suppose further that a fabricated object has fabrication score that indicates five occurrences of beads that are too narrow (see FIG. 5B) and four occurrences of beads that deviate from their intended location (see FIG. 5C). In this case, the object is expected to fail since its fabrication score falls under the gold standard that is associated with the "failed" qualification score.

Once constructed using the gold standard fabrication scores, the database can be used for determining the quality of a fabricated object without the need to apply a physical test to it. Specifically, an object can be fabricated as further detailed hereinabove and a fabrication score can be generated for the object. The previously constructed gold standard database is then searched for a gold standard fabrication score that best matches the fabrication score generated for the fabricated object. The found gold standard fabrication score is used as a pointer to a respective database entry, and the qualification score can be pulled from the respective database entry and assigned to the fabricated object. Based on the assigned qualification score, the operator can predict, for example, what would have been the result of a physical test, had such test been applied to the fabricated object.

Following is a more detailed description of a preferred protocol for image acquisition (operation 62 of method 60), in embodiments of the disclosure in which a layerwise extrusion-based AM is employed. The protocol is described with reference to the flowchart diagram shown in FIG. 4.

Figure 4:
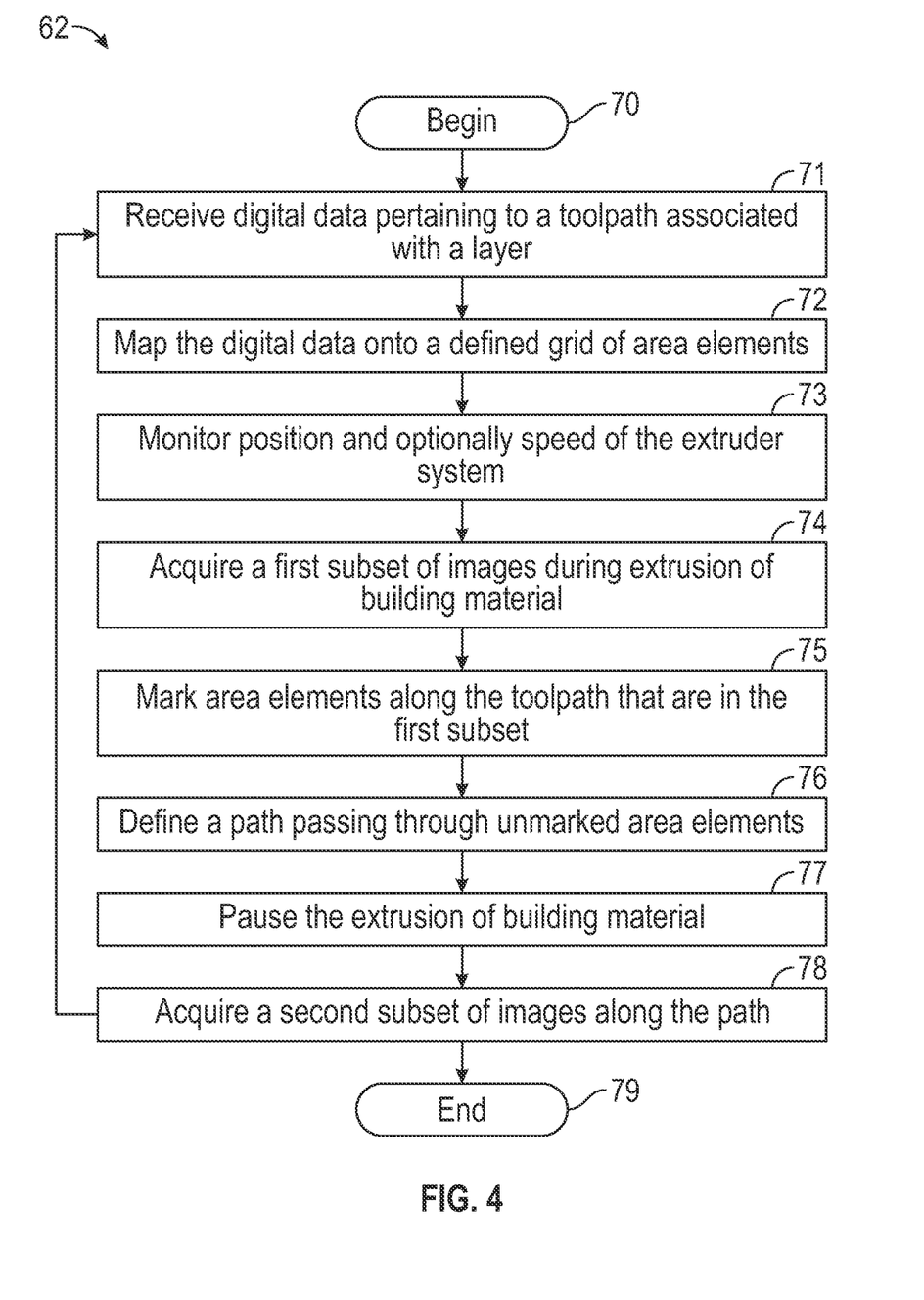
FIG. 4 is a flowchart diagram describing an image acquisition protocol according to some embodiments of the present disclosure.

The image acquisition protocol begins at 70 and continues to 71 at which digital data pertaining to a toolpath associated with a layer is received, e.g., from a slicing procedure used by the AM. The digital data is optionally and preferably received for each layer of the fabricated object. The digital data can be obtained for more than one layer (e.g., all layers), stored in a computer readable memory, and then retrieved one layer at a time. Alternatively, the digital data can be obtained from the slicing procedure one layer at a time.

The protocol proceeds to 72 at which the digital data of the respective layer is mapped onto a defined grid of area-elements over the layer. The grid can be defined in advance, prior the execution of the image acquisition protocol. The grid is preferably a two-dimensional rectangular grid, but other types of two-dimensional grid, e.g., a honeycomb grid or the like, are also contemplated. In some embodiments of the present disclosure, each area-element of the grid has a length along at least one of its dimensions that equals or approximately equals the characteristic diameter of a typical bead extruded from the extruder system of the AM system. The mapping 72 allows the computer to identify a group G of area-elements of the grid along the toolpath, wherein all area-elements that are occupied by the toolpath (once mapped onto the grid) are defined as belonging to the group G, and all other area-elements of the grid are defined as not belonging to the group G.

At 73 the position and/or the velocity (preferably a velocity vector) of the extruder system is optionally and preferably monitored. The protocol continues to 74 at which a first portion of the set of images (referred to herein as a first subset of images) is acquired while the extruder system extrudes building material. Preferably, the image acquisitions at 74 are executed such that, for each camera that is employed by the AM system, each area-element is not imaged more than once. This can be ensured, for example, by defining a borderline within the field-of-view of the respective camera, and transmitting a signal to the camera to acquire an image while or immediately after the area-element crosses the defined borderline. The computer can determine the time point at which the area-element crosses the borderline by continuously monitoring a signal from the imager of the camera, or, when operation 73 is executed, the computer can calculate the time point based on the monitored position and velocity of the extruder system.

In various exemplary embodiments of the disclosure, the image acquisitions at 74 are executed only for area-elements that are occupied by building material, or area-elements that are expected to be occupied by building material based on the toolpath. In these embodiments, area-elements which are not occupied or not expected to be occupied by building material are not imaged. Alternatively, image acquisition can be executed for all area-elements irrespectively whether or not they are occupied or expected to be occupied by building material.

At 75, area-elements of the group G that are contained in the images of the first subset are marked as visited by the camera. The marking can be executed in the memory of the computer and need not be shown on the images themselves. When 73 is executed, the marking 75 is preferably based, at least in part, on the monitored position and/or velocity.

The image acquisition protocol optionally and preferably continues to 76 at which a path passing through all area-elements of the group G, other than the marked area-elements, is defined. The path is optionally and preferably a minimal path, and it can be calculated using any optimization algorithm known in the art, such as, but not limited to, an evolutionary algorithm, a nearest neighbor algorithm, ant colony optimization algorithm, and the like. Preferably, the path is a polyline. The protocol can then continue to 77 at which the extrusion of building material is paused, and to 78 at which a second portion of the set of images (referred to herein as a second subset of images) is acquired while the extruder system is paused from extrusion but is guided, together with the camera(s), along the path defined at 76. Preferably, the acquisition 78 is according to the same principles described above with respect to the first subset, wherein for each camera that is employed by the AM system, each area-element is not imaged more than once, and wherein each imaged area-element is marked as visited.

From 78, the image acquisition protocol optionally and preferably loops back to 71 and is repeated for another layer of the object. The protocol ends at 79.

The present embodiments contemplate execution of the protocol 70 irrespectively of the fabrication score. For example, an AM system such as system 10 can be operated to fabricate an object wherein the controller of the AM system can execute the protocol 70, and provide the images for inspection, optionally and preferably after stitching the images as further detailed hereinabove.

Thus, according to some embodiments of the present disclosure there is provided an AM system (e.g., system 10), which comprises an extruder system (e.g., extruder system 18), and a controller (e.g., controller 34) configured for controlling the extruder system to extrude a flow of building material in layers to form building material beads along toolpaths corresponding to a shape of the object. The AM system can also comprise one or more cameras (e.g., camera 40), that are mechanically coupled to the extruder system, and that is/are controlled by the controller to acquire a set of images of the building material beads, and a data processor (e.g., computer 38) that receives digital data pertaining to a toolpath associated with each layer, and maps the digital data onto a defined grid of area-elements so as to identify a group of area-elements along the toolpath. The controller can control the camera to acquire a first subset of images while the extruder system extrudes the building material along the toolpath, and a second subset of images while the extruder system is paused from extruding the building material, but moves along a path. The data processor can define the path based on all area-elements of the group that are not contained in images of the first subset.

It is expected that during the life of a patent maturing from this application many relevant additive manufacturing technologies will be developed and the scope of the term additive manufacturing is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

What is claimed is:

1. A method of additive manufacturing, comprising:
   operating an additive manufacturing system for fabricating a multiplicity of objects, wherein each of the multiplicity of objects is fabricated using a same computer model data and instructions for printing the model, and while acquiring a set of images during fabrication of each of said objects;
   for each object, analyzing a respective set of images to identify fabrication irregularities to determine a fabrication score;
   clustering said multiplicity of objects according to said fabrication scores into at least two clusters, wherein each cluster of the at least two clusters of objects is attributed similar physical attributes; and
   applying a physical test to an object of each cluster, and attributing a result of said mechanical test to at least one other object of said cluster for which said mechanical test was not applied.

2. The method according to claim 1, wherein said fabrication score comprises a single value for each object.

3. The method according to claim 2, wherein said single value is a total number of irregularities identified for said object.

4. The method according to claim 1, wherein said fabrication score comprises a plurality of values for each object.

5. The method according to claim 4, wherein said plurality of values comprises a total number of irregularities for each of a plurality of types of irregularities identified for said object.

6. The method according to claim 5, wherein said plurality of values comprises a total number of irregularities for each of a plurality of types of irregularities identified for said object, and each of a plurality of locations of irregularities within said object.

7. A method of additive manufacturing, comprising:
   by an extruder system mechanically coupled to a camera, extruding a flow of building material to form building material beads along toolpaths forming layers corresponding to a shape of an object, and acquiring a set of images for each building material bead wherein a first portion of said set of images is acquired while said extruder system extrudes said flow of building material, and a second portion of said set of images is acquired while said extruder system is paused from extruding said building material;
   for each layer, stitching said images to provide a stitched image describing said layer, and analyzing said stitched image to identify bead irregularities;
   generating a fabrication score for said object based on said bead irregularities;

repeating said extruding, said stitching, said analyzing, and said generating said fabrication score, thereby providing a multiplicity of objects; and clustering said multiplicity of objects according to said fabrication scores into at least two clusters.

8. The method according to claim 7, further comprising applying a mechanical test to an object of each cluster, and attributing a result of said mechanical test to at least one other object of said cluster for which said mechanical test was not applied.

9. The method according to claim 7, wherein said fabrication score comprises at least a value indicative of a volume of said bead, and a value indicative of a location of said bead.

10. The method according to claim 7, wherein said extruder system is mechanically coupled to at least two cameras, each having a different field-of-view relative to said extruder system, and wherein said stitching comprises stitching at least two images acquired by different cameras.

11. The method according to claim 7, wherein said imaging is a at a wavelength selected based on a type of said building material.

12. The method according to claim 7, and further comprising illuminating said building material by non-curing radiation detectable by said camera, wherein at least one of a wavelength and an intensity of said radiation is selected based on a type of said building material.

13. The method according to claim 7, wherein said extruding is in layers, and the method comprising, for each layer:

receiving digital data pertaining to a toolpath associated with said layer;

mapping said digital data onto a defined grid of area-elements over said layer so as to identify a group of area-elements along said toolpath;

while said extruder system extrudes said flow of building material, acquiring said first portion of said set of images, and marking area-elements of said group that are contained in said images; and while said extruder system is paused, acquiring said second portion of said set of images, while guiding said extruder system along a path passing through all area-elements of said group other than said marked area-elements.

14. The method according to claim 13, comprising monitoring a position of said extruder system, wherein said marking said area-elements is based, at least in part, on said monitored position.

15. The method according to claim 13, comprising monitoring at least a velocity of said extruder system, wherein said marking said area-elements is based, at least in part, on said monitored velocity.

16. The method according to claim 13, wherein there is a single camera and wherein each area-element is not imaged more than once.

17. The method according to claim 13, wherein there is a plurality of cameras, and wherein for each camera, each area-element is not imaged more than once.

18. The method according to claim 7, wherein said stitching comprises stitching images of said first portion of said set of images before acquiring images of said second portion of said set of images.

19. A method of additive manufacturing a multiplicity of objects, comprising:

by an extruder system mechanically coupled to a camera, extruding a flow of building material to form building material beads along toolpaths forming layers corresponding to a shape of an object, wherein each of the multiplicity of objects is fabricated using a same computer model data and instructions for printing the model, and acquiring a set of images for each building material bead;

for each layer, stitching said images to provide a stitched image describing said layer, and analyzing said stitched image to identify bead irregularities;

generating a fabrication score for said object of the multiplicity of objects based on said bead irregularities; and comparing said fabrication score to a gold standard fabrication score, and determining, based on said comparison, a qualification score for said object of the multiplicity of objects, wherein when said object of the multiplicity of objects meets or exceed the qualification score, said object of the multiplicity of objects is of an acceptable part quality.

* * * * *